Sept. 12, 1939. M. E. BENESH 2,172,952
HEATING UTENSIL
Filed Feb. 12, 1937
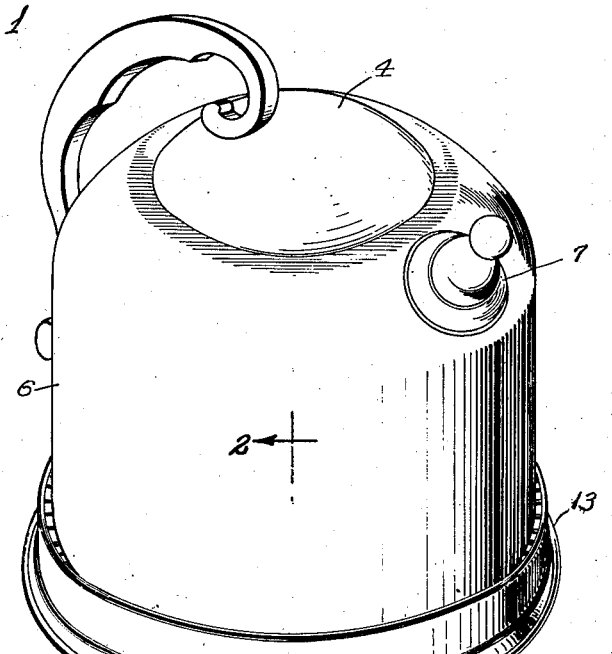
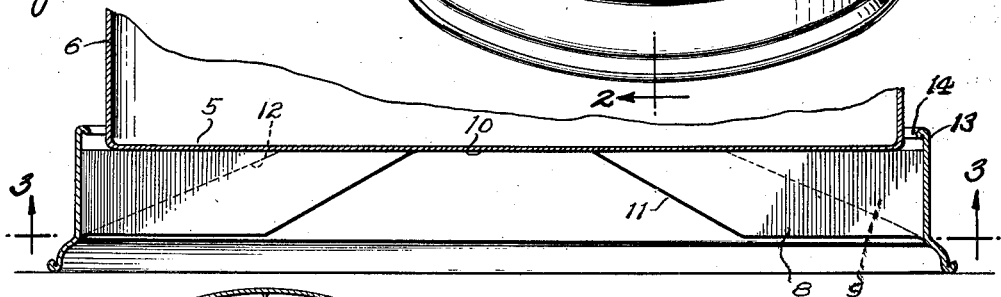
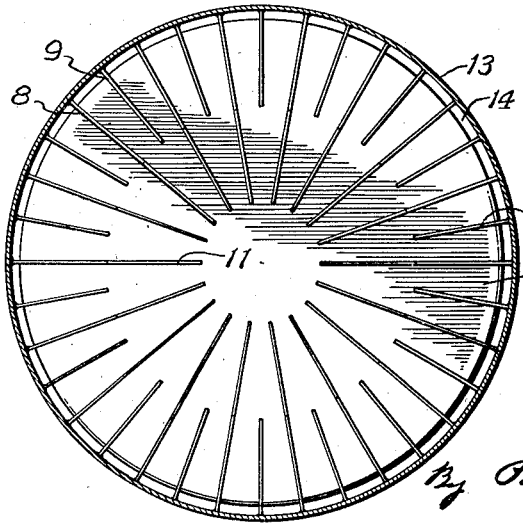
INVENTOR
Matthew E. Benesh
By Parker, Carlson, Pitzner & Hubbard
ATTORNEYS Patented Sept. 12, 1939

2,172,952

UNITED STATES PATENT OFFICE 2,172,952

HEATING UTENSIL

Matthew E. Benesh, Cicero, Ill.

Application February 12, 1937, Serial No. 125,400

6 Claims. (Cl. 53—9)

The present invention relates to heating utensils, such as are commonly used on kitchen gas ranges, and has as its primary object the provision of a new and improved utensil of this type which is much more efficient than similar utensils of prior constructions.

A more specific object is to provide a heating utensil with a novel bottom structure or heat economizer having good thermal conductivity, and having a large distributed heat absorption area for a comparatively small mass.

A further object resides in the provision of a new and improved bottom structure of the foregoing character which serves to facilitate complete combustion, to limit dilution and cooling of the gaseous heating medium by secondary air, and to control the flow of the heating medium so as to effect increased utilization of the available heat.

Another object is to provide a novel bottom heating structure which is unitary with the utensil, and which is simple, light and inexpensive in construction.

Further objects and advantages will become apparent as the description proceeds.

In the accompanying drawing, Figure 1 is a perspective view of a utensil embodying the features of my invention.

Fig. 2 is a fragmentary vertical sectional view on an enlarged scale taken substantially along line 2—2 of Fig. 1.

Fig. 3 is a horizontal sectional view taken substantially along line 3—3 of Fig. 1.

Referring more particularly to the drawing, the invention is adapted for various kinds and types of heating utensils, such, for example, as kettles, teapots, coffeepots, pans and double boilers, etc., and for purposes of illustration is herein disclosed as embodied in a water warming kettle 4 having a bottom wall 5, a peripheral or side wall 6, and a filling and pouring spout 7.

The primary aim of the invention is to improve the heating efficiency of utensils of the foregoing character, and more particularly to utilize the available heat as fully as possible by increasing the heat absorption surfaces and the heat transfer coefficient of the heating elements. To this end, the utensil 4 is provided with a special bottom structure which is in good thermal contact with the wall 5 and which presents a large and distributed heat absorption area for a comparatively small mass. When positioned over a gaseous flame, the bottom structure also serves to insure more complete combustion of the fuel mixture before the products of combustion come in contact with the heating surface, and to prevent dilution of these products by an undesirable excess of secondary air, and the attendant drop in temperature that would result. Preferably, the bottom structure and the utensil 4 are integral to constitute a unit.

In its preferred construction, the bottom structure comprises a plurality of heat absorbing elements 8 and 9 distributed over the underside of the bottom wall 5. These elements may be of any suitable material, such as aluminum or copper, having a high coefficient of heat conductivity, and may be provided in various forms within the broad concept of the invention. In the present instance, the elements 8 and 9 are thin flat metal strips, constituting fins or vanes, which are disposed laterally in perpendicular relation to the wall 5 and with their upper side edges in engagement therewith, and which are arranged to extend radially in uniformly peripherally spaced relation. It will be evident that the fins or vanes 8 and 9, being thin and exposed at both sides present a very large heat absorption area supplementing the normal area of the wall 5.

For the efficient utilization of the absorbed heat it is desirable that the fins 8 and 9 be in good thermal contact with the wall 5. Hence, they are integrally or rigidly connected along their upper side edges to the wall 5, as, for example, by being cast or formed integrally therewith, by being soldered, welded or brazed thereon, or by being mechanically jointed thereto.

The fins or vanes 8 and 9 are also utilized to effect a more uniform distribution of heat over the entire exposed surface of the bottom wall 5. Thus, the fins 8 and 9 do not extend over, but are arranged about, the central portion of the wall 5, as indicated at 10, where the heat from the source, such as a gas flame, is most intense, and are so shaped that the heat absorption area increases progressively toward the periphery, where the temperature differences between the heating gases and the surfaces being heated are less by reason of absorption and dilution. The ratio of the fin area to the unit area of the bottom of the vessel may be varied to obtain the best efficiency economically justified, and if desired may be increased outwardly. More particularly, the fins 8 and 9 extend to and preferably uniformly beyond the peripheral edge of the bottom wall 5, and are of various lengths, for example, long and short, and alternated. Also, the inner end edges 11 of the long fins 8, and the bottom side edges 12 of the short fins 9, are inclined upwardly and inwardly to the bottom wall 5.

The fins 8 and 9 not only provide a large distributed heat absorption area, but also define channel-shaped flow passages for the gaseous heating medium. Hot products of combustion impinging against the central portion of the bottom wall 5 are deflected outwardly, and caused to flow through the aforesaid passages in close contact with the sides of the fins 8 and 9. It will be evident that a large body of the gaseous heating medium is thereby maintained in direct contact with the heat absorption area, and that the flow is retarded by the friction and baffling effect set up by the fins 8 and 9, whereas in plane bottom utensils the heating medium passes quickly out of the heating zone and only a small body thereof ever comes in direct contact with the bottom wall.

Encircling the fins 8 and 9 and in good thermal contact with the outer ends thereof is a base ring 13. Preferably, the ring 13 is integrally connected to the fins 8 and 9 as by welding. The upper marginal edge of the ring 13 projects above the fins 8 and 9 and the bottom wall 5 into spaced concentric overlapping relation with the side wall 6 of the utensil 4, and defines an annular outlet passage 14 for the gaseous heating medium. Since the ring 13 is in good thermal contact with the fins 8 and 9, it serves to increase the effective heat absorption area. It also restricts the upward flow of the gaseous heating medium, thereby increasing the time for heat transfer, and directs the flow closely about the side wall 6 of the utensil 4 for further heat absorption.

Another function of the base ring 13 is to limit free intermingling of the surrounding atmosphere with the hot products of combustion until after the latter have passed from the heating surfaces. As a result, these products are not diluted and cooled by an undesired excess of secondary air.

Preferably, the lower marginal edge of the base ring 13 projects below the fins 8 and 9 to provide a larger combustion space, so that combustion will be practically complete before the products reach and are chilled by the heat absorption area.

In general, it will be evident that I have provided a novel and highly advantageous heating utensil which is much more efficient than utensils of prior constructions, and which is simple, light and inexpensive in construction.

I claim as my invention:

1. In a heating utensil, a peripheral side wall, a bottom heating wall, and a base ring integrally connected to said bottom wall and projecting substantially below said bottom wall to define a combustion space, the upper marginal edge of said base ring projecting above said bottom wall into spaced relation about said side wall to define a restricted annular outlet passage for said combustion space.

2. In a heating utensil, a peripheral side wall, a bottom heating wall, a base member projecting substantially below said bottom wall to define a combustion space and projecting above said bottom wall into spaced relation about said side wall to define a restricted outlet passage for said combustion space, and heat absorbing elements within said space and in thermal contact with said bottom wall.

3. In a heating utensil, in combination, a plane circular bottom wall, a plurality of alternately short and long radial fins secured in uniformly peripherally spaced relation to said bottom wall and projecting equal distances beyond the periphery of said bottom wall, and a base ring encircling said fins and in thermal contact with the outer ends thereof.

4. In a heating utensil, in combination, a peripheral side wall, a plane circular bottom wall, a plurality of relatively long thin flat radial fins disposed laterally in perpendicular relation to said bottom wall and integrally connected along their upper side edges to said bottom wall, a plurality of relatively short thin flat radial fins disposed laterally in perpendicular relation to said bottom wall and integrally connected along their upper side edges to said bottom wall, said long and short fins being alternated and annularly arranged in uniformly spaced relation about a central portion of said wall, and defining radial outwardly diverging flow passages for the heating gases unrestricted to the periphery of said bottom wall, and a base ring encircling said fins and rigidly connected in thermal contact with the outer ends thereof, said base ring projecting above and below said fins, and projecting above said bottom wall in annularly spaced relation to said side wall to define an outlet for said flow passages.

5. In a heating utensil, in combination, a plane circular bottom wall, a plurality of relatively long radial fins integrally connected along their upper side edges to said bottom wall, a plurality of relatively short radial fins integrally connected along their upper side edges to said bottom wall, said long and short fins being alternated and annularly arranged in uniformly spaced relation about a central portion of said wall, and a base ring encircling said fins and integrally secured to the outer ends thereof and projecting above and below said fins.

6. A bottom structure adapted for good thermal contact with the bottom heating wall of a utensil comprising, in combination, a plurality of alternately long and short radial fins defining radial flow passages, and a base ring encircling said fins and in good thermal contact with the outer ends thereof for deflecting the heating gases laterally upward from between said fins.

MATTHEW E. BENESH.